Dec. 28, 1948.  A. J. SOLARI  2,457,284
ADJUSTABLE FLUID SEAL
Filed Sept. 24, 1945

INVENTOR.
Archie J. Solari
BY
Charles P. Vajtech
Atty.

UNITED STATES PATENT OFFICE 2,457,284

ADJUSTABLE FLUID SEAL

Archie J. Solari, Chicago, Ill., assignor to Crane Packing Company, Chicago, Ill., a corporation of Illinois Application September 24, 1945, Serial No. 618,102

3 Claims. (Cl. 286—11)

This invention relates to sealing devices and particularly to such devices which utilize a pair of radially disposed relatively rotatable surfaces to effect a seal.

There has been devised a seal of the foregoing type which is comprised of a plurality of individual elements all of which must be assembled in their proper relation at the location where they are to be used. Thus the seal is comprised of a seal seat with a rubber mounting therefor, a sealing washer adapted to cooperate with the seat, a sealing element for effecting a seal between the washer and its support, a driving sleeve for the washer, a band for preloading one end of the sealing element upon the support, the band being provided with means for driving the sleeve, a spring for urging the washer against the seat and a ferrule for transmitting the spring pressure to the sealing element around the washer. Although certain of these elements may be assembled at the factory there still remain, nevertheless, a number of elements which must be handled separately at the location where the seal is to be installed, and in addition a number of relatively fine adjustments must be made to make sure that the seal will function properly. Where the seal is to be used in a relatively inaccessible place, it becomes extremely difficult to handle the elements of the seal individually and to make sure that they are properly located relative to one another.

Thus the principal object of this invention is to provide a seal of the type described which can be readily installed in relatively inaccessible places.

Another object of this invention is to provide a method of assembling a seal of the type described in relatively inaccessible places, all of the elements of the seal being properly spaced relative to one another for the proper operation of the seal.

A specific object of this invention is to provide a seal which may be assembled for the most part at a place remote from that at which it is to be used so that it may be installed as a complete unit.

Figure 1:
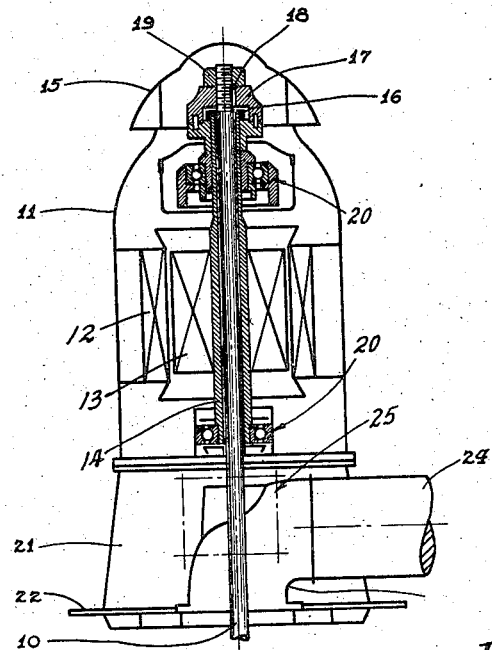
Figure 2:
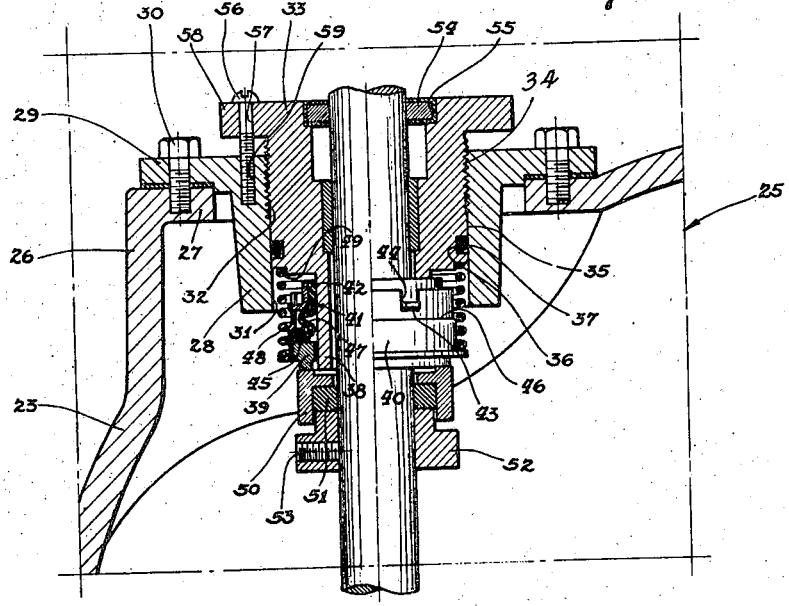

These and other objects and features of this invention will become apparent from the following detailed description when taken together with the accompanying drawings, in which Fig. 1 is a schematic elevation of a device to which this invention is particularly well adapted; and Fig. 2 is an enlarged view of that portion of the device to which the seal of this invention may be applied.

Referring now to Fig. 1 for a description of a typical application for a seal and method of this invention, there is shown a deep well rotary pump driving mechanism, the pump itself not being shown since it forms no part of this invention. The pump, however, is driven from a vertical shaft 10 which rises upward into a housing 11 containing a driving motor having field coils 12 and an armature 13 mounted on a hollow shaft 14. Said hollow shaft 14 passes upward through housing 11 around shaft 10 into a chamber formed by a removable cover 15 where it is secured by means of a nut 16 to a driving coupling 17. Coupling 17 is keyed at 18 to the top of shaft 10, said shaft 10 likewise being supported from coupling 17 by a nut 19 which is threaded over the end of shaft 10. Suitable bearings 20 are provided for supporting shafts 14 and 10.

Housing 11 and the motor contained therein are removably mounted on a base casting 21 which in turn is removably mounted on a suitable foundation (not shown) by a flange 22. Within base casting 21 is an elbow 23 which is connected at its lower end to the pipe (not shown) leading to the pump, and at its other end to a side outlet pipe 24. It will be seen that shaft 10 is centrally located with respect to the bottom opening of elbow 23 and continues on upward through the elbow wall to the motor housing 11. It is at the region where the shaft 10 passes through the elbow wall that a seal is required. This region is shown by a rectangle 25 in Fig. 1.

Referring now to Fig. 2 for an enlarged view of the sealing apparatus, it will be seen that elbow 23 is formed with an offset 26 having an internal circular flange 27 which is substantially normal to the axis of rotation of shaft 10. On flange 27 is mounted a sleeve housing 28 having a flange 29 which overlies flange 27 and which is secured to flange 27 by a plurality of bolts 30. Said sleeve housing 28 has a machined opening 31 which is threaded at its upper end 32 to receive an adjusting sleeve 33. Said sleeve 33 is provided with a threaded section 34 cooperating with threaded end 32 of the opening 31 and also with a relatively smooth section 35 in which is formed a rectangular groove 36. Within groove 36 is located an endless resilient ring of rubber or synthetic rubber 37 having a substantially circular cross-section in its free state, but which is distorted when mounted in groove 36 so as to substantially completely fill the groove, a small area of the groove being left unfilled to permit the ring to expand. Said ring 37 forms a fluid-tight seal between adjusting sleeve 33 and the sleeve housing 28.

Adjusting sleeve 33 is formed with an axially extending flange 38 on which is mounted a sub-assembly of the seal. Said sub-assembly comprises a sealing washer 39 mounted within a driving sleeve 40 and sealed with respect to flange 38 by a flexible deformable sealing element 41. One end of the sealing element 41 is preloaded upon flange 38 by means of a driving band 42 which has a series of lugs 43 extending into slots 44 in sleeve 40 to provide a slidable driving connection therebetween. One end of sealing element 41 is formed with a flange 45 which bears against the back of sealing washer 39. A shoulder 46 formed in sleeve 40 bears against a washer 47 which in turn bears against flange 45 on sealing element 41. A spring 48 is compressed between the end of sleeve 40 and a groove 49 in adjusting sleeve 33 to provide a force urging washer 39 axially downward.

The remainder of the seal is comprised of a seat member 50 which is in direct contact with washer 39 through radially disposed sealing surfaces on said element, said seat member 50 being mounted on a rubber or other resilient ring 51 in such a manner that the seat member is free to move in all directions relative to shaft 10 thereby adjusting itself to misalignment between the shaft and adjusting sleeve 33. Said ring 51 is pressed upon shaft 10 so that a driving force is created in the ring tending to turn ring 51 and seat 50 with shaft 10. The axial thrust produced by spring 48 and transmitted through the washer 39, seat 50 and deformable ring 51 is taken by a retaining collar 52 which is maintained in its proper position in shaft 10 by one or more set screws 53. In order to prevent dirt or other foreign material from falling into the space between adjusting sleeve 33 and shaft 10 a dirt seal 54 is provided, which seal is pressed into a recess 55 in the upper end of adjusting sleeve 33. The adjusting sleeve is held against rotation by a locking screw 56 which passes through an opening 57 in a flange 58 on sleeve 33 into threaded hole 59 in sleeve housing 28.

It will be apparent from the foregoing description that in order to assemble the seat 50 on shaft 10 it is necessary first to locate collar 52 at the proper point on shaft 10, adjust the set screw 53, then slide flexible ring 51 over shaft 10 until it abuts collar 52 and finally to slide seat ring 50 over shaft 10 and force it over flexible ring 51 thereto to achieve the proper driving relation between seat ring 50 and flexible ring 51. The first-mentioned sub-assembly is assembled by first placing washer 47 around flange 45 on flexible sealing element 41, then sliding driving sleeve 40 over the ferrule and flange and finally sliding driving band 42 over the end of flexible element 41 with the lugs 43 in the notches 44. Spring 48 is then clipped over driving sleeve 40, and washer 39 is placed within sleeve 40 until it abuts flange 45 on the sealing element 41. The entire sub-assembly is then slid upon its support until the spring is compressed the proper amount or until flange 42 is located properly upon its support. Obviously, the manner of assembly just described would be extremely difficult to carry out if all of it had to be done piece by piece, at the elbow 23.

The method of assembling the complete sealing device on shaft 10 in accordance with this invention is as follows:

With the housing 11 removed together with armature 13, hollow shaft 14 and coupling 17, shaft 10 is placed in the well through elbow 23 to approximately the position that it will occupy in operation. Sleeve housing 28 is then bolted to elbow 23. A mark is placed on the shaft corresponding to the top of the sleeve housing. Shaft 10 is then raised from the well and retaining collar 52 is slid over the end of the shaft to a point below the mark a distance corresponding to the location of collar 52 relative to the top of sleeve housing 28 shown in Fig. 2. Collar 52 is secured to the shaft at this point by tightening set screw 53. The rubber or resilient ring 51 is slid over the end of the shaft until it abuts collar 52. The seat ring 50 is likewise slid over the end of shaft 10 and is forced over rubber ring 51 to the position shown in Fig. 2.

The sub-assembly comprising resilient sleeve 41, driving band 42, driving shell 40, washer 47 and spring 48 is assembled by the seal manufacturer and is supplied to the pump manufacturer as a unit. Adjusting sleeve 33 is then fitted with the dirt seal 54 by pressing the latter into the recess 55 and the above sub-assembly is pressed upon axial flange 38 to the position shown at Fig. 2. Washer 39 is then inserted into the opening formed by shell 40 and, if desired, may be cemented to flange 45 of resilient sealing element 41. It will be noted that in the position shown in Fig. 2 the resilient sealing element 41 is not compressed to its limiting position in the direction of driving band 42 so that washer 39 and the movable parts of the sub-assembly may be moved axially relative to flange 38 a small distance. Sealing ring 37 is placed in its groove 36 and the adjusting sleeve 33 is then slid over the end of shaft 10 and the shaft is reinserted into elbow 23 and the well. Housing 11 and the enclosed motor can now be placed in position and secured to the base casting 21. Coupling 17 is secured to shafts 10 and 14 and shaft 10 is located in its proper position by adjusting nut 19 before adjusting sleeve 33 is positioned. Adjusting sleeve 33 is now turned in the direction of advancing it toward seat ring 50 until the end of flange 38 on sleeve 33 is pressed against ring 50. This is merely for the purpose of locating the seal sub-assembly initially relative to the seat ring 50, since in operation it is not desirable to have flange 38 contacting the seat ring 50. After flange 38 is pressed against the seat ring, sleeve 33 is turned back approximately one turn until locking screw 56 is aligned with the opening 59. This fixes the position of the sleeve and sub-assembly relative to seat ring 50 the proper distance for best performance. Locking screw 56 is then tightened and thereafter serves to prevent sleeve 33 from turning relative to sleeve housing 28 and altering the optimum spacing between the seal seat and sub-assembly. A suitable opening (not shown) is provided in base casting 21 through which the various adjustments just described can be made. The coupling 17 is then secured in place and the pump is ready for use.

It will be observed that although the seal is below the surface of flange 27 of elbow 23 so that it is relatively inaccessible and certainly not readily visible, nevertheless the entire seal is properly located on shaft 10 in relation to elbow 23 until washer 39 is too worn for further use.

Thus it is possible for the seal manufacturer to supply the seal sub-assembly and if necessary the sleeve associated therewith so that the one installing the pump and its motor need not be an expert in the art of mechanical seals and need have only such knowledge as is required to tighten a gland on a stuffing box for example. The method of installing the seal is simple and accurate and is applicable to various forms of flexible seal sub-assemblies.

It is understood that the foregoing description is merely illustrative of a preferred embodiment of this invention and that the scope of the invention therefore is not to be limited thereto but is to be determined by the appended claims.

What is claimed is:

1. A sealing device for relatively rotatable members which comprises a sealing ring, an adjustable abutment for the ring on one of the members, a seal sub-assembly including an axially movable washer, and means for mounting the sub-assembly on the other member, said other member having a threaded opening therein, said means including a sleeve insertable into the threaded opening around the first-mentioned member and having threads cooperating with the threads of the opening, means for effecting a seal solely between the sleeve and the mounting means, an axial extension on the sleeve aligned with a portion of the ring, means for sealing the washer with respect to the extension, said sub-assembly being compressible such that the extension may be advanced by means of the threads into contact with the ring after the washer has contacted the sealing ring, and means for locking the sleeve against rotation, thereby to fix the sleeve axially relative to the ring.

2. A sealing device for relatively rotatable members which comprises a sealing ring, an adjustable abutment for the ring on one of the members, a seal sub-assembly including an axially movable washer, and means for mounting the sub-assembly on the other member, said other member having an opening therein which is threaded over a portion of its length and smooth over the remainder of its length, a sleeve insertable into the threaded opening around the first mentioned member and having a threaded portion cooperating with the threads in the opening and a groove facing the smooth portion, packing means in the groove contacting the smooth portion and effecting a seal solely between the sleeve and the mounting means, an axial extension on the sleeve aligned with a portion of the ring, means for sealing the washer with respect to the extension, said sub-assembly being compressible such that the extension may be advanced by means of the threads into contact with the ring after the washer has contacted the ring, and means for locking the sleeve against rotation, thereby to fix the sleeve axially relative to the ring.

3. A sealing device for relatively rotatable members which comprises a sealing ring, an adjustable abutment for the ring on one of the members, a seal sub-assembly including an axially movable washer, and means for mounting the sub-assembly on the other member in such manner that the movable washer contacts the sealing ring, said other member having a threaded opening thereon, said means including a sleeve insertable into the threaded opening around the first-mentioned member and having threads cooperating with the threads in the opening, means for effecting a seal solely between the sleeve and the mounting means, an axial extension on the sleeve aligned with a portion of the ring and concentric with the axially movable washer, means for sealing the washer with respect to the extension, said sub-assembly being compressible such that the extension may be advanced by means of the threads into contact with the ring after the washer contacts the ring, and means for locking the seal against rotation, thereby to fix the sleeve axially relative to the ring.

ARCHIE J. SOLARI.

REFERENCES CITED

The following references are of record in the file of this patent:

UNITED STATES PATENTS

| Number | Name | Date |
| --- | --- | --- |
| 1,905,772 | Walton | Apr. 25, 1933 |
| 2,382,960 | Compton et al. | Aug. 21, 1945 |
| 2,404,547 | Strid | July 23, 1946 |